US012643162B2

(12) United States Patent
Dufour et al.

(10) Patent No.: US 12,643,162 B2
(45) Date of Patent: Jun. 2, 2026

(54) DOUBLE-SIDED, INDEXABLE CUTTING INSERT WITH HIGH RAMPING CAPABILITY AND CUTTING TOOL THEREFOR

(71) Applicant: Kennametal Inc., Latrobe, PA (US)

(72) Inventors: Jean Luc D. Dufour, Greensburg, PA (US); Ron L. Dudzinsky, Derry, PA (US)

(73) Assignee: KENNAMETAL INC., Latrobe, PA (US)

( * ) Notice: Subject to any disclaimer, the term of this patent is extended or adjusted under 35 U.S.C. 154(b) by 517 days.

(21) Appl. No.: 18/127,144

(22) Filed: Mar. 28, 2023

(65) Prior Publication Data

US 2024/0326140 A1 Oct. 3, 2024

(51) Int. Cl.
*B23C 5/20* (2006.01)
*B23C 5/10* (2006.01)
*B23C 5/22* (2006.01)

(52) U.S. Cl.
CPC ............ *B23C 5/2226* (2013.01); *B23C 5/109* (2013.01); *B23C 5/205* (2013.01); *B23C 2200/0494* (2013.01); *B23C 2200/083* (2013.01); *B23C 2200/168* (2013.01); *B23C 2200/203* (2013.01); *B23C 2200/287* (2022.02); *B23C 2200/326* (2013.01); *B23C 2200/361* (2013.01)

(58) Field of Classification Search
CPC ..... B23C 5/202; B23C 5/207; B23C 2220/24;

B23C 2220/243; B23C 2220/246; B23C 2220/283; B23C 2200/208; B23B 2220/242; B23B 2220/245

See application file for complete search history.

(56) References Cited

U.S. PATENT DOCUMENTS

2004/0223816 A1 11/2004 Sheffler et al.
2004/0223818 A1 11/2004 Gamble et al.
(Continued)

FOREIGN PATENT DOCUMENTS

CN 113649631 A 11/2021
CN 115243816 A 10/2022
(Continued)

OTHER PUBLICATIONS

International Search Report and Written Opinion for International Application No. PCT/US2024/021471, mailed Jul. 23, 2024, 09 Pages.

(Continued)

*Primary Examiner* — Nicole N Ramos
(74) *Attorney, Agent, or Firm* — Christopher J. Owens

(57) ABSTRACT
A double-sided, indexable cutting insert for a milling cutter includes a first surface, a second surface, and side surfaces. Cutting edges are defined at an intersection between the first and second surfaces and side surfaces. Each cutting edge includes a first cutting-edge portion, a second cutting-edge portion and a third cutting-edge portion. The first and second surfaces include diagonally opposite recessed regions. The cutting insert is mounted in a milling cutter defining a radial rake angle, A, and a ramping angle, B, with respect to a central, rotational axis of the milling cutter that provide superior performance for both milling and ramping cutting operations.

18 Claims, 9 Drawing Sheets

(56)     References Cited

U.S. PATENT DOCUMENTS

| | | | |
|---|---|---|---|
| 2006/0013661 A1* | 1/2006 | Long | B23C 5/2213 |
| | | | 407/113 |
| 2012/0009029 A1* | 1/2012 | Saji | B23C 5/202 |
| | | | 407/103 |
| 2015/0139743 A1 | 5/2015 | Assaf et al. | |
| 2017/0291231 A1* | 10/2017 | Mao | B23C 5/202 |
| 2018/0015554 A1 | 1/2018 | Roman | |
| 2018/0339350 A1 | 11/2018 | Mura et al. | |
| 2019/0030629 A1 | 1/2019 | Vlcek et al. | |
| 2019/0047059 A1 | 2/2019 | Yamada et al. | |
| 2019/0061024 A1 | 2/2019 | Shiroma | |
| 2019/0160562 A1 | 5/2019 | Yuri et al. | |
| 2019/0381576 A1 | 12/2019 | Takahiro et al. | |
| 2020/0306844 A1 | 10/2020 | Atar | |
| 2020/0338652 A1 | 10/2020 | Choi et al. | |
| 2021/0362250 A1 | 11/2021 | Andersson et al. | |
| 2022/0105577 A1 | 4/2022 | Aso et al. | |

FOREIGN PATENT DOCUMENTS

| | | | |
|---|---|---|---|
| EP | 3050655 B1 | 3/2017 | |
| JP | 2015193049 A2 | 11/2015 | |
| WO | 21049786 A1 | 3/2021 | |
| WO | 21192499 A1 | 9/2021 | |

OTHER PUBLICATIONS

European Office Communication for Application No. EP247817406, mailed on Nov. 4, 2025, 03 pages.

\* cited by examiner

DOUBLE-SIDED, INDEXABLE CUTTING INSERT WITH HIGH RAMPING CAPABILITY AND CUTTING TOOL THEREFOR

BACKGROUND

The invention relates to a cutting insert for a cutting operation, and more particularly, to a double-sided, indexable cutting insert that is capable of performing milling and ramping operations.

Milling cutters for performing machining operations on metallic work pieces are well known in the prior art. Such cutters typically comprise a cylindrical or disc-shaped body which is detachably connectable to a rotating drive shaft. Cutting inserts are mounted around the outer periphery of the cutter body for producing a series of metal-shaving cuts on a work piece.

Conventional indexable milling inserts that advertise ramping capability can only perform ramping operations at a very slight or shallow angle. As a result, conventional indexable milling inserts that advertise ramping capability perform ramping operations very poorly.

Accordingly, there is a need for an improved cutting insert that can adequately perform both milling and ramping cutting operations.

SUMMARY

The problem of a double-sided cutting insert that is not able to adequately perform both milling and ramping cutting operations has been solved by providing a cutting insert with a recessed region on a top or bottom surface adjacent a portion of the main cutting edge that defines a radius that increases the radial rake angle to minimize rubbing or friction during a ramping cutting operation.

In one aspect, a double-sided, indexable cutting insert for a milling cutter comprises a first surface including a central planar seating surface, a second surface opposite the first surface, a first side surface including a central planar seating surface orthogonal with respect to the first side surface, and a first cutting edge defined at an intersection between the first surface and the first side surface. The first cutting edge is substantially V-shaped and includes a first cutting-edge portion extending radially outward with respect to a horizontal axis of the cutting insert, a second cutting-edge portion extending radially outward with respect to the horizontal axis, and a third cutting-edge portion extending between the first cutting-edge portion and the second cutting-edge portion and substantially parallel with respect to the horizontal axis.

In another aspect, a milling cutter comprises a shank and an upper portion having an insert pocket. The insert pocket includes a bottom seating surface, a radial seating surface and an axial seating surface. A cutting insert is mounted in the insert pocket. The cutting insert includes a first surface including a central planar seating surface, a second surface opposite the first surface, a first side surface including a central planar seating surface orthogonal with respect to the first side surface, and a first cutting edge defined at an intersection between the first surface and the first side surface. The first cutting edge is substantially V-shaped and includes a first cutting-edge portion extending radially outward with respect to a horizontal axis of the cutting insert, a second cutting-edge portion extending radially outward with respect to the horizontal axis, and a third cutting-edge portion extending between the first cutting-edge portion and the second cutting-edge portion and substantially parallel with respect to the horizontal axis.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION

Figure 1:
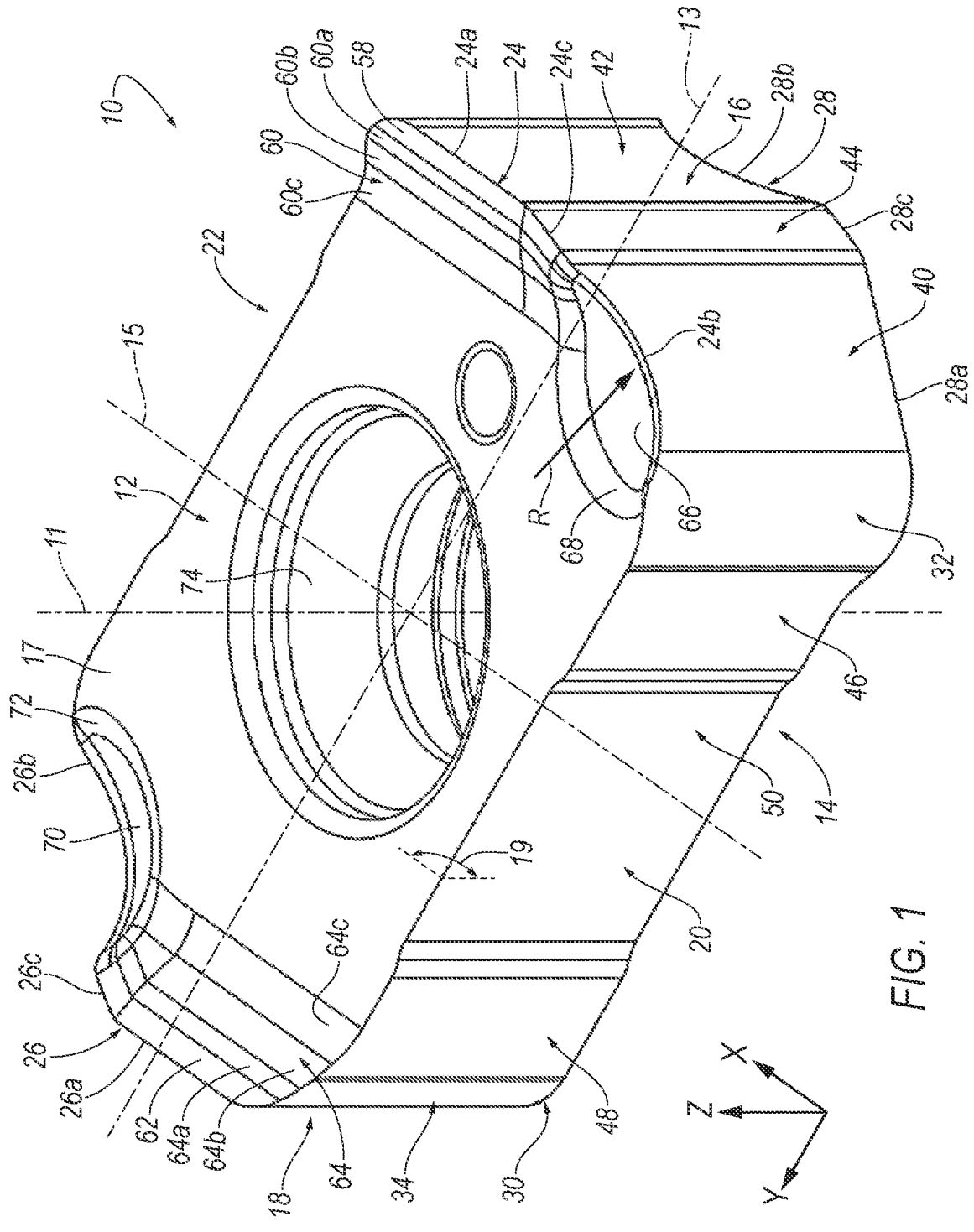
FIG. 1 is an isometric view of a cutting insert, such as a milling insert, according to an embodiment of the disclosure.

Referring to the drawings, wherein like reference characters represent like elements, there is shown in FIGS. 1-5 a cutting insert 10 that includes generally, a first surface 12, a second surface 14 opposite the first surface 12, and side surfaces 16, 18, 20, 22. The side surfaces 16, 18, 20, 22 serve as seating surfaces when the cutting insert 10 is mounted in a cutting tool, such as a milling cutter that is described below. The double-sided cutting insert 10 is capable of performing both milling cutting operations and ramping cutting operations at high ramping angles.

It is noted that the cutting insert 10 is a double-sided insert in which the first surface 12 is substantially identical to the second surface 14. Therefore, only the first surface 12 may be described below for brevity. As is known in the art, the first surface 12 may become the top surface and the second surface may become the bottom surface when mounted within a tool holder (not shown), and vice versa. The cutting insert 10 includes a central, longitudinal axis 11 (Z-axis), a second axis 13 (Y-axis) perpendicular to the central, longitudinal axis 11, and a third axis 15 (X-axis) perpendicular to both the central, longitudinal axis 11 and the second axis 13. It is also noted that a central planar seating surface 17 of the first surface 12 (and also the second surface 14) forms an angle 19 of approximately ninety (90) degrees (i.e., orthogonal) with respect to each of the four side surfaces 16, 18, 20, 22.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, a radial rake angle is the angle between the rake face and a radius measured in a plane normal to the central axis of the milling cutter. The radial rake angle is important in determining the sharpness and strength of the cutting edge.

As used herein, an axial rake angle is the angle between the cutting edge and the central axis of the milling cutter. This angle affects the face milling process in several ways. It directs chip flow and impacts the strength of the cutting edge.

As used herein, angle, A, is the angle starting from the radial rake angle to the highest area or the front area of the cutting insert. The angle, A, passes through the central axis of the milling cutter.

As used herein, angle, B, is the ramping angle starting from the highest area or the front area of the cutting insert or intersection between the radius for ramping and the facet surface. Angle, B, can be parallel to angle A or equal to about 0 degrees to about 90 degrees. The angle B passes through the center axis of the milling cutter or under the center axis of the central axis of the milling cutter.

The cutting insert 10 includes a first cutting edge 24 at the intersection between the side surface 16 and the first surface 12, and a second cutting edge 26 at the intersection between the side surface 18 and the first surface 12. Similarly, the cutting insert 10 includes a third cutting edge 28 at the intersection between the side surface 16 and the second surface 14, and a fourth cutting edge 30 at the intersection between the side surface 18 and the second surface 14 (not visible in FIG. 1). Thus, the double-sided cutting insert 10 includes a total of four cutting edges 24, 26, 28 and 30.

Figure 2:
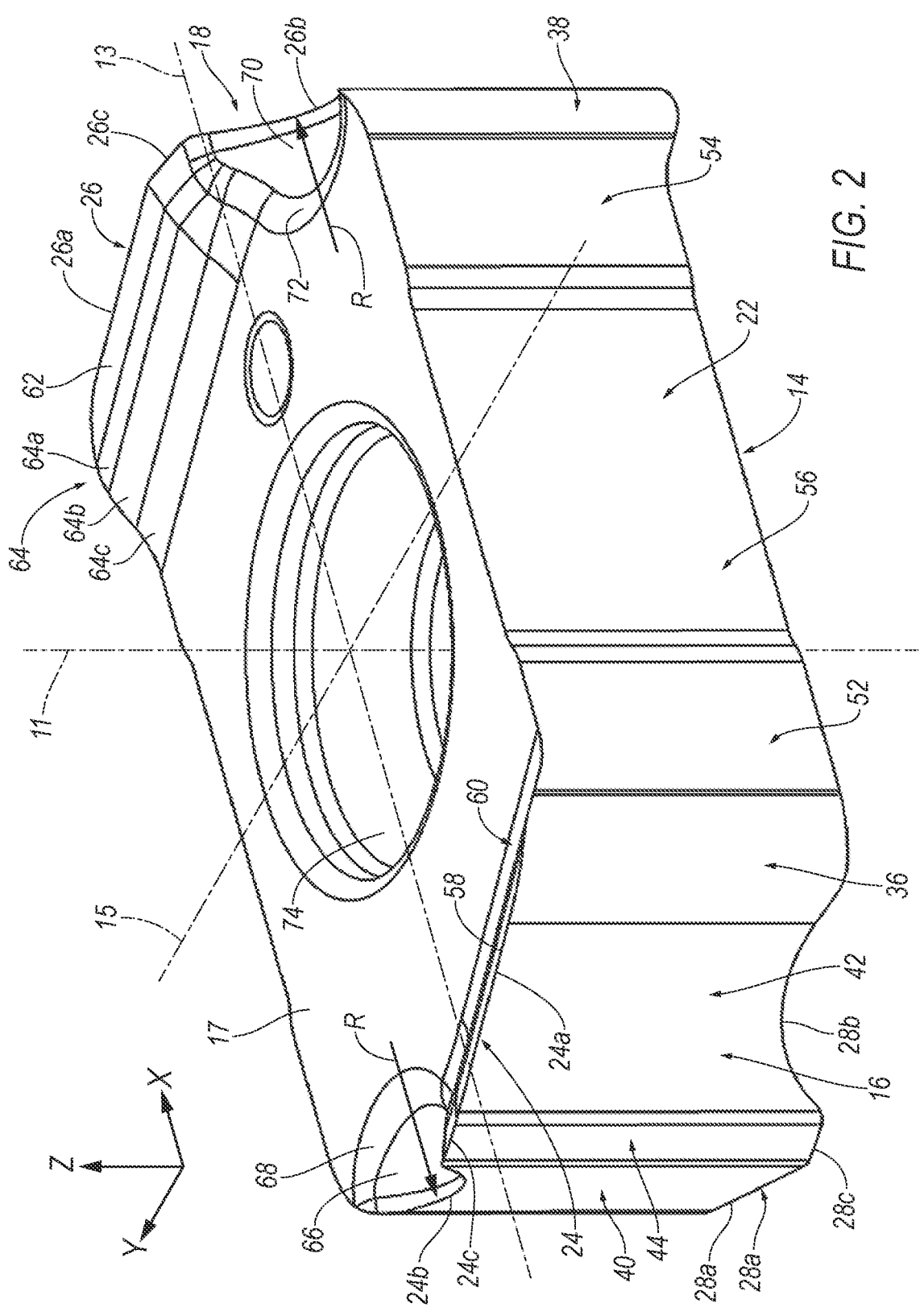
FIG. 2 is another isometric view of the cutting insert of FIG. 1.

As shown in FIG. 2, each cutting edge 24, 26, 28, 30 is substantially V-shaped. For example, the first cutting edge 24 includes a first cutting-edge portion 24a, a second cutting-edge portion 24b and a third cutting-edge portion 24c disposed on the horizontal axis (i.e., y-axis) and between the first major cutting-edge portion 24 and the second major cutting-edge portion 24b. In one embodiment, the third cutting-edge portion 24c is centered on the central, longitudinal axis (i.e., y-axis). Because all the cutting edges 24, 26, 28, 30 are substantially identical, only the cutting edge 24 will be discussed herein for brevity. It should be noted that the first cutting-edge portion 24a is higher in elevation than the central planar seating surface 17 and acts as a main cutting edge during machining operations, while the second cutting-edge portion 24b is lower in elevation than the central planar seating surface 17, as shown in FIG. 2.

Each of the first cutting-edge portion 24a, the second cutting-edge portion 24b and the third cutting-edge portion 24c may be either planar or arcuate (i.e., curved). For example, in one embodiment, the first cutting-edge portion 24a is substantially planar and forms an angle 32 with respect to the horizontal axis (i.e., x-axis). The angle 32 can be between about 0.1 degrees to about 30 degrees. Similarly, the second cutting-edge portion 24b is substantially planar and forms an angle 34 with respect to the horizontal axis. The angle 34 can be approximately equal to the angle 32 or may be different. In this embodiment, the third cutting-edge portion is substantially planar and substantially parallel to the horizontal axis (i.e., x-axis) 15.

In another embodiment, the first cutting-edge portion 24a is arcuate or curved with a radius, R1, between about IC/2 to about 10×IC, where IC is the inscribed circle of the cutting insert 10. Similarly, the second cutting-edge portion 24b is arcuate or curved with a radius, R2, between about IC/2 to about 10×IC. The radius, R1, can be approximately equal to the radius, R2, or may be different. In this embodiment, the third cutting-edge portion is formed with a radius, R3, between about 0.05 mm and about 600 mm.

The third cutting-edge portion 24c can also be planar or arcuate. The third cutting-edge portion 24c provides a superior surface finish during machining a workpiece (not shown). In one embodiment, the third cutting-edge portion 24c has a width, W, of between about 0.0 mm to about 10.0 mm. In other words, it is possible that the first cutting edge 24 includes only the first cutting-edge portion 24a and the second cutting-edge portion 24b.

In the illustrated embodiment, a corner radius 32 connects the side surfaces 16, 20, a corner radius 34 connects the side surfaces 18, 20, a corner radius 36 connects the side surfaces 16, 22, and a corner radius 38 connects the side surfaces 18, 22.

The side surface 16 includes a facet surface 40 extending radially outward from the corner radius 32, a facet surface 42 extending radially outward from the corner radius 36, and a facet surface 44 extending between the facet surface 40 and the facet surface 42. The facet surfaces 40, 42, 44 extend entirely between the first surface 12 and the second surface 14.

Figure 3:
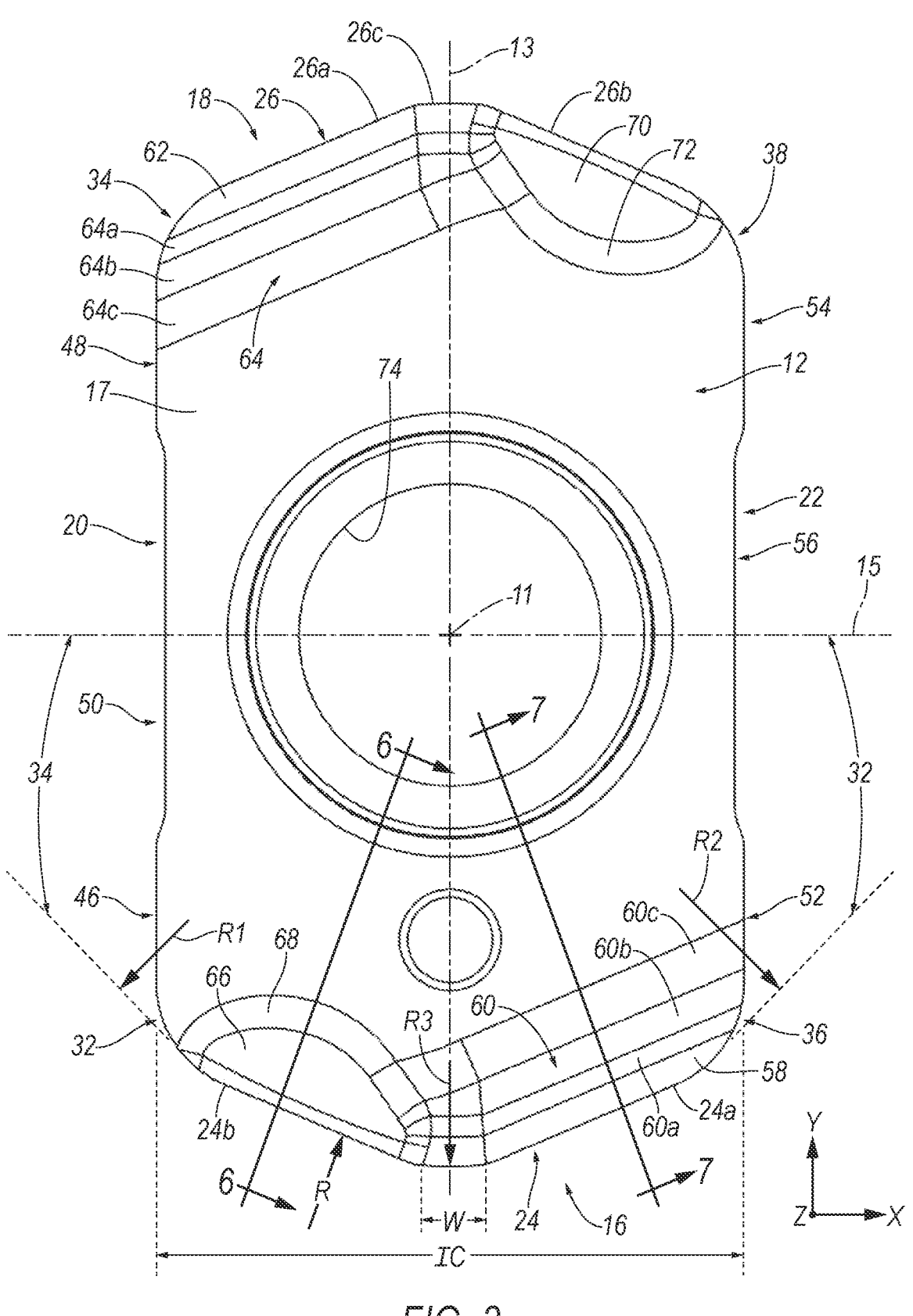
FIG. 3 is a front view of the cutting insert of FIG. 1 (the rear view is identical to the front view)
Figure 4:
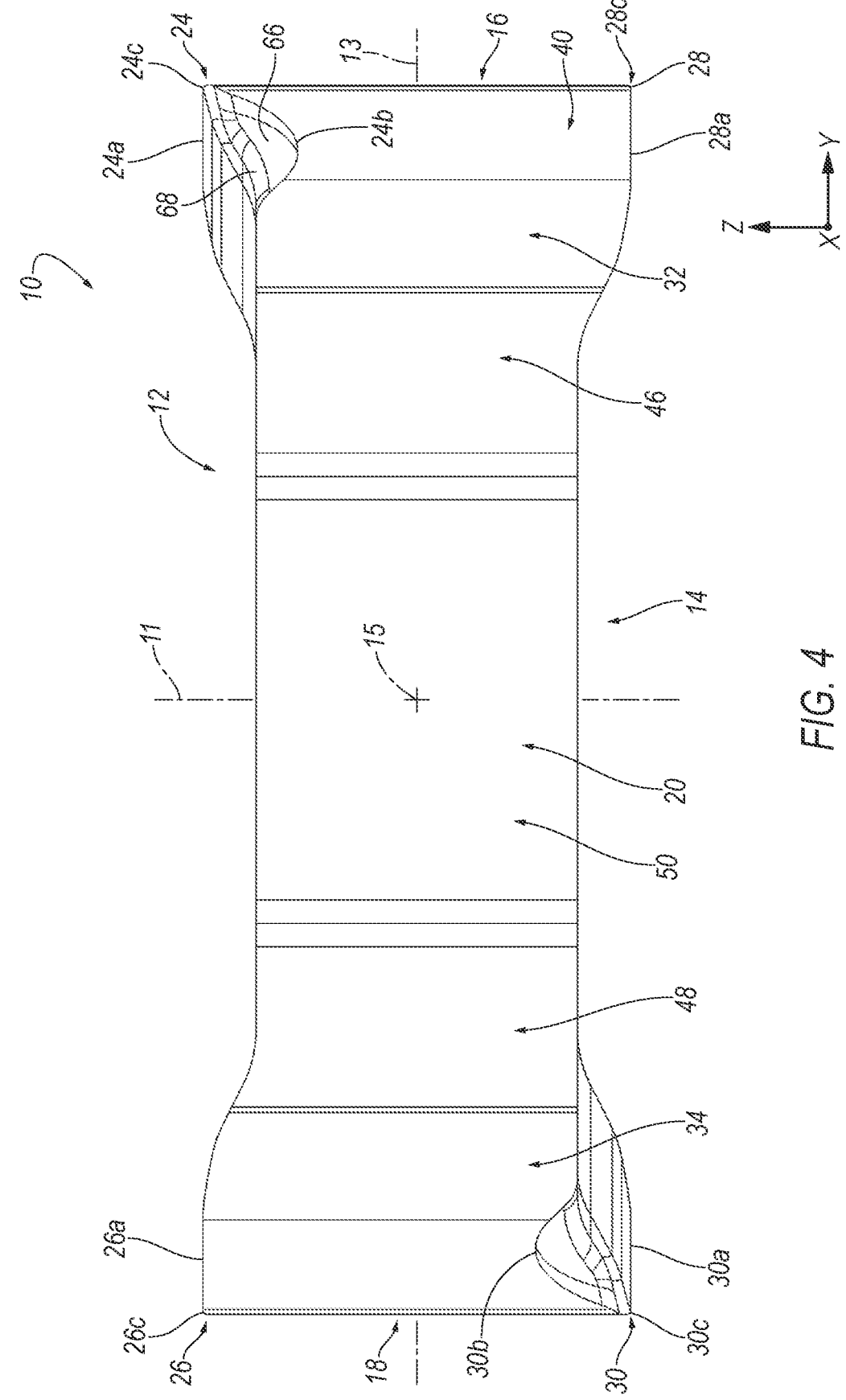
FIG. 4 is a side view of the cutting insert of FIG. 1.
Figure 5:
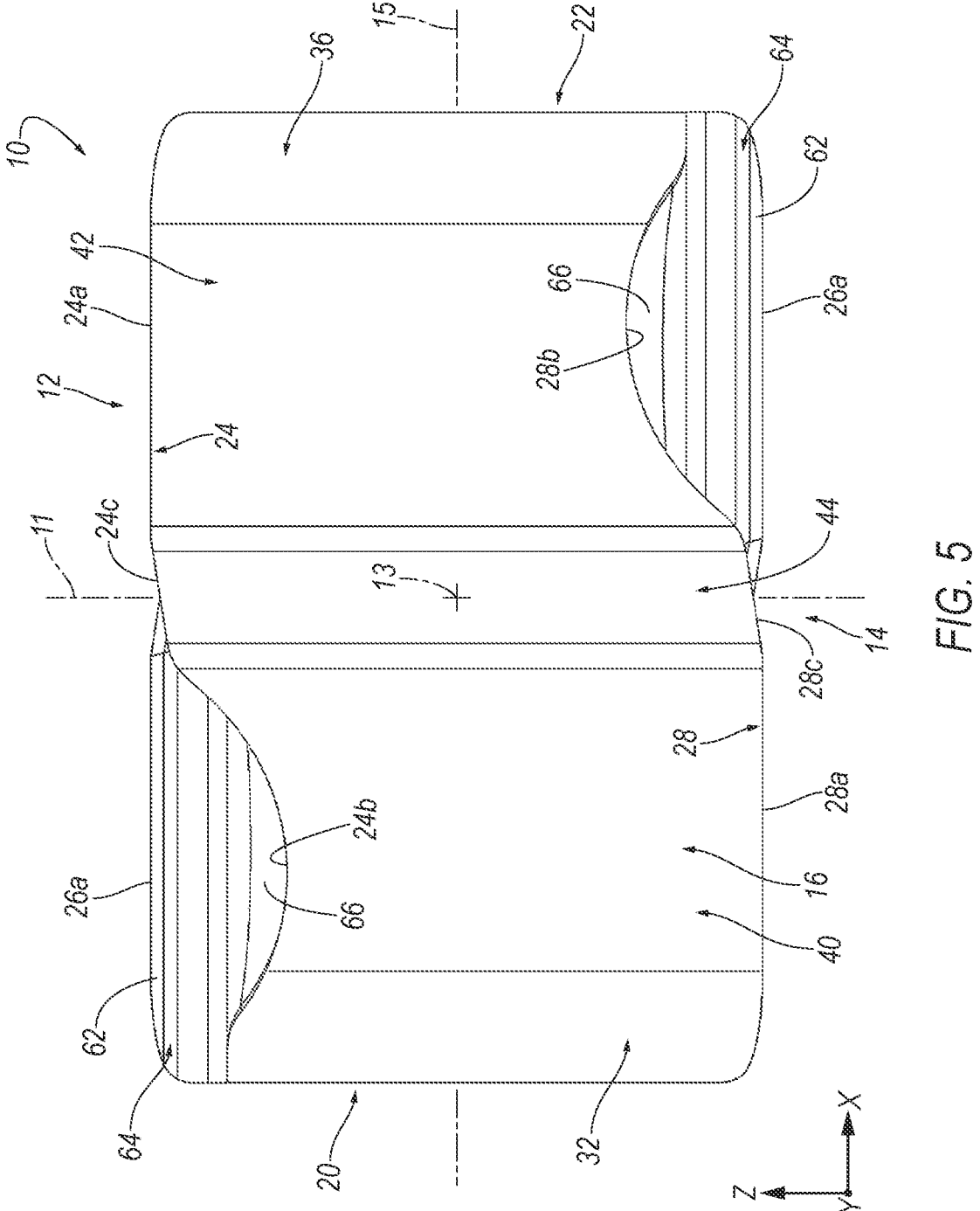
FIG. 5 is an end view of the cutting insert of FIG. 1.

In the case where the cutting-edge portions 24a, 24b, 24c are substantially planar, the facet surfaces 40, 42, 44 are substantially planar. In this case, it is noted that the planar facet surface 44 is substantially parallel to the horizontal axis 15 (i.e., x-axis), as seen in FIG. 3. In the case where the cutting-edge portions 24a, 24b, 24c are arcuate or curved with radius, R1, R2, R3, respectively, the facet surface 40, 42, 44 are also arcuate or curved.

It will be appreciated that the cutting insert 10 is mirror symmetric about both horizontal axes 13, 15 (i.e., y-axis and x-axis). Although not visible in FIGS. 1 and 2, the side surface 18 of the cutting insert 10 includes the facet surface 42 extending radially outward from the corner radius 34, a facet surface 40 extending radially outward from the corner radius 38, and a facet surface 44 extending between the facets surface 40, 42 and substantially parallel to the horizontal axis (i.e., x-axis).

The side surface 20 includes a planar seating surface 46 extending from the corner radius 32, a planar seating surface 48 extending from the corner radius 34 and a planar recessed surface 50 between the planar seating surface 46 and the planar seating surface 48. The planar recessed surface 50 is radially inward with respect to the planar seating surfaces 46, 48, as shown in FIG. 3. Similarly, the side surface 22 includes a planar seating surface 52 extending from the corner radius 36, a planar seating surface 54 extending from the corner radius 38 and a planar recessed surface 56 between the planar seating surface 52 and the planar seating surface 54. The planar recessed surface 56 is radially inward with respect to the planar seating surfaces 52, 54. The planar seating surfaces 46, 48 provide two contact points and add radial stability for the cutting insert 10 when mounted in an insert pocket.

The first surface 12 of the cutting insert 10 includes the central planar seating surface 17. The first surface 12 also includes a rake face 58 adjacent the first cutting-edge portion 24a and a chip breaker 60 adjacent the rake face 58 to aid in the evacuation of chips during a cutting operation, such as a milling operation. In the illustrated embodiment, the chip breaker 60 comprises one or more facet surfaces 60a, 60b, 60c. It should be appreciated that the first surface 12 also includes a rake face 62 adjacent the first cutting-edge portion 26a and a chip breaker 64 comprising one or more facet surfaces 64a, 64b, 64c diagonally opposite the rake face 58 and the chip breaker 60.

In addition, the first surface 12 includes a recessed region 66 adjacent the second cutting-edge portion 24b to aid in the evacuation of chips during a cutting operation, such as a ramping operation. The recessed region 66 causes the second cutting-edge portion 24b to be formed with a radius, R, as seen in FIGS. 1 and 2. The radius, R, can be in a range between about 0.5 mm to about 20 mm.

In the illustrated embodiment, the radius, R, is smooth and continuous. However, it will be appreciated that the radius, R, can be formed with a plurality of planar faceted surfaces, an elliptical surface, and the like. The recessed region 66 also provides clearance during a cutting operation. In the illustrated embodiment, the recessed region 66 is substantially egg-shaped. However, it will be appreciated that the invention is not limited by the shape of the recessed region 66 and the invention can be practiced with other shapes, such as elliptical, circular, and the like. The recessed region 66 includes a chip breaker 68 to provide additional assistance in the evacuation of chips. Similarly, the first surface 12 includes a recessed region 70 diagonally opposite the recessed region 66 with a chip breaker 72.

It will be appreciated that the first surface 12 and the second surface 14 of the cutting insert 10 are mirror symmetric. Thus, although not visible in FIGS. 1 and 2, the second surface 14 also includes the central planar seating surface 17, the rake faces 58, 62, the chip breakers 60, 64, and the recessed regions 66, 70 with chip breakers 68, 72. A countersunk bore 74 extends entirely between the first surface 12 and the second surface 14.

Figure 6:
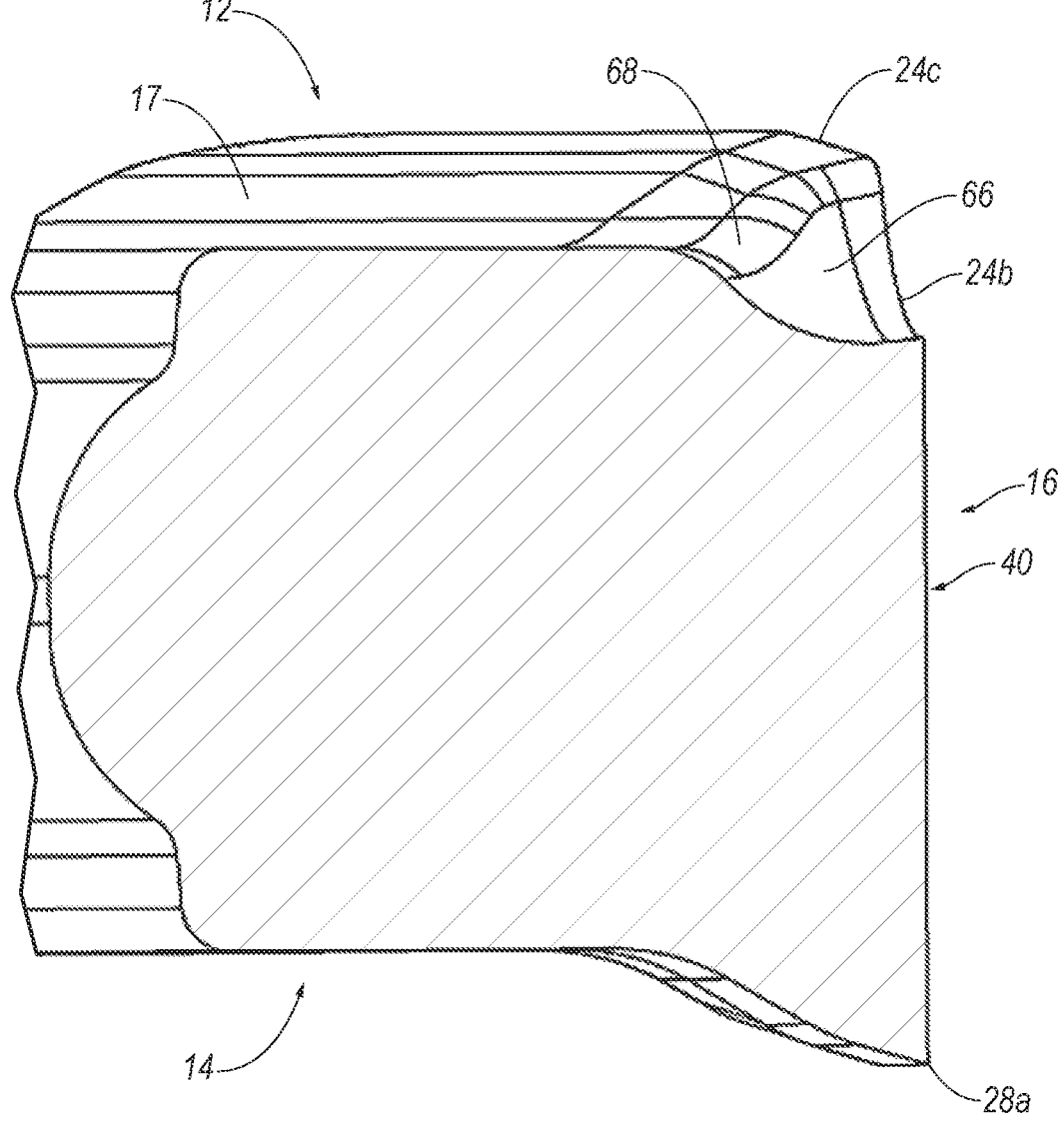
FIG. 6 is a cross-sectional view of the cutting insert taken along line 6-6 of FIG. 3.
Figure 7:
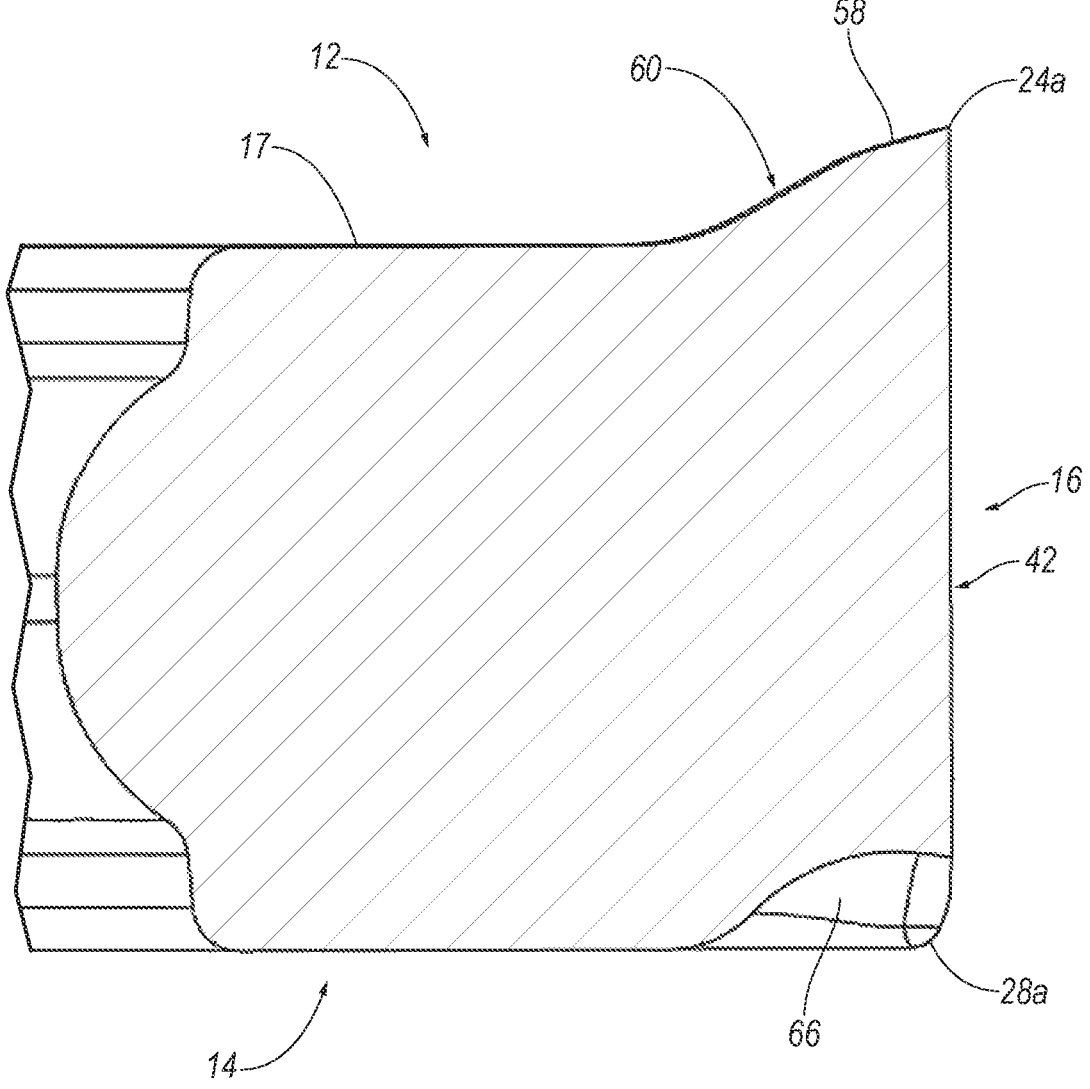
FIG. 7 is a cross-sectional view of the cutting insert taken along line 7-7 of FIG. 3.
Figure 8:
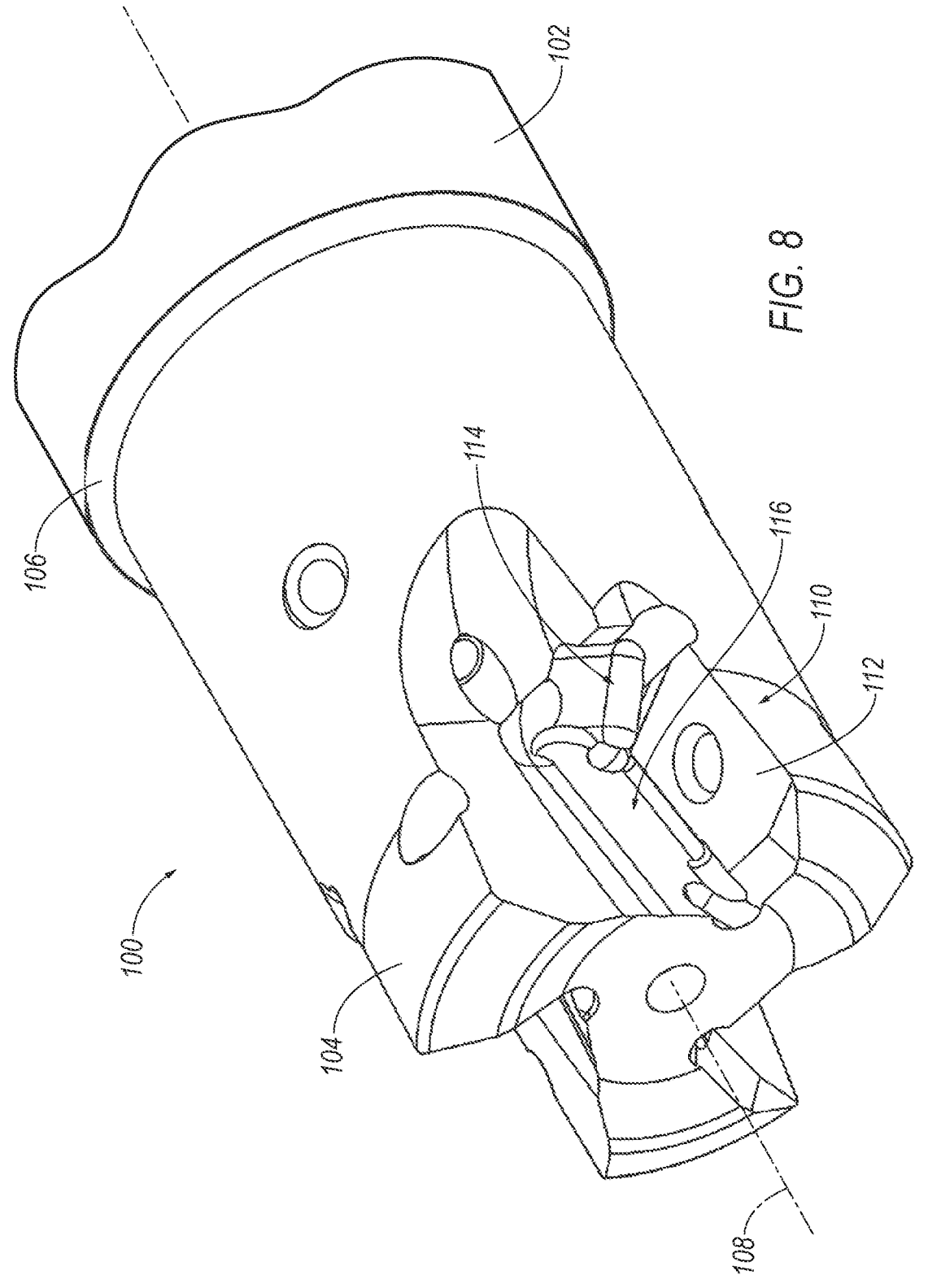
FIG. 8 is an isometric view of a milling cutter according to an embodiment of the invention with the cutting inserts not being mounted in the pockets for clarity.
Figure 9:
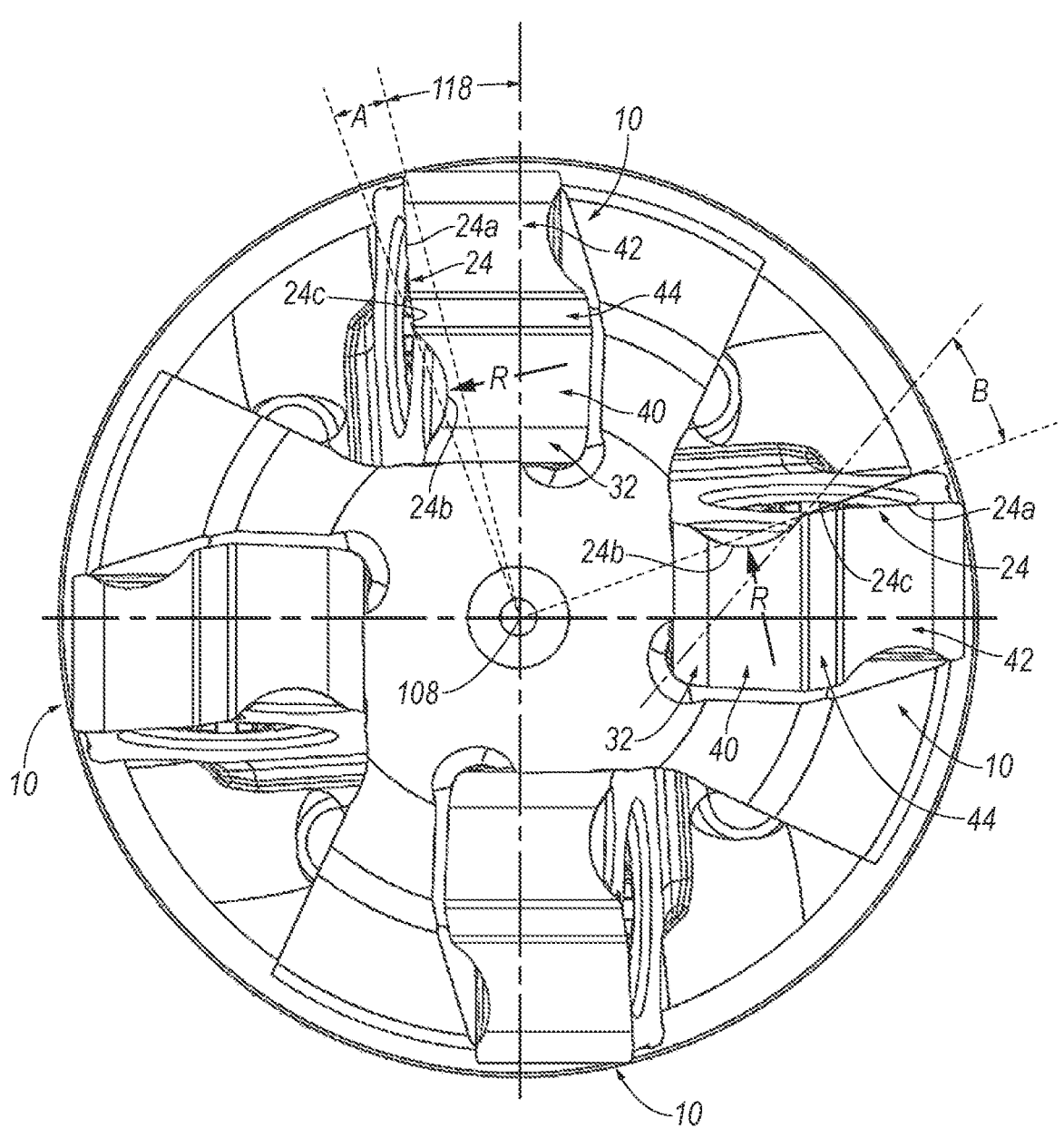
FIG. 9 is an end view of the milling cutter of FIG. 8 with the cutting insert of FIG. 1 mounted in the pockets.

Referring now to FIGS. 8 and 9, there is shown a milling cutter 100 that is capable of receiving the cutting insert 10 of the invention. In general, the milling cutter 100 includes a shank 102, an upper portion 104 and a transition surface 106 between the shank 102 and the upper portion 104. The cutter 100 is preferably made from heat-treated steel, such as H13 tool steel, or other materials known to those skilled in the art. The specific material used will vary as a consequence of desired design characteristics of the cutter 100. The cutter 100 is rotated about a center axis 108. The cutter 100 also includes an insert pocket, shown generally at 110, formed at the leading end of the upper portion 104 of the cutter 100. As shown in FIG. 6, the insert pocket 110 includes a bottom seating surface 112, a radial seating surface 116 and an axial seating surface 114. Thus, the cutting insert 10 is mounted in the pocket 110 with three points of contact.

In the illustrated embodiment, the milling cutter 100 is capable of mounting four cutting inserts 10 within a respective insert pocket 110. However, it will be appreciated that the milling cutter 100 is not limited by the number of indexable cutting inserts 10 that can be mounted in the insert pockets 110, and that the invention can be practiced with any desired number of cutting inserts limited by only the physical limitations of the material properties of the milling cutter. For example, the milling cutter can have two, three, five, six, seven, eight, or more insert pockets.

As shown in FIG. 9, each cutting insert 10 is mounted with a respective pocket 110 with a radial rake angle 118 of between about 0 degrees to about 45 degrees. In addition, an angle, A, provided by the radius, R, of the second cutting-edge portion 24b is the angle starting from the radial rake angle 118 to the region highest in elevation on the front of the cutting insert 10 that passes through the central axis 108 of the milling cutter 100. The angle, A, provides the cutting insert 10 with a maximum ramping angle equal to the radial rake angle 118 plus the angle, A, before the cutting insert 10 begins to contact the workpiece (not shown). The angle, A, can range between about 0 degrees and about 90 degrees.

Further, an angle, B, is the ramping angle starting from the region highest in elevation on the front of the cutting insert 10 that either passes through the center axis 108 of the milling cutter 100 (i.e., parallel to angle, A) or below the center axis 108, as shown in FIG. 9. The angle, B, can be between about 0 degrees to about 90 degrees.

As described above, the cutting insert 10 of the disclosure provides a solution to rubbing or friction for a double-sided cutting insert during a machining operation.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A double-sided, indexable cutting insert for a milling cutter, comprising:

a first surface including a central planar seating surface;

a second surface opposite the first surface;

a first side surface substantially perpendicular to both the first surface and the second surface; and a first cutting edge defined at an intersection between the first surface and the first side surface, wherein the first cutting edge is substantially V-shaped in plan view and includes a first cutting-edge portion extending radially outward with respect to a horizontal axis of the cutting insert, a second cutting-edge portion extending radially outward with respect to the horizontal axis, and a third cutting-edge portion extending between the first cutting-edge portion and the second cutting-edge portion and substantially parallel with respect to the horizontal axis, wherein the first surface includes a recessed region adjacent the second cutting-edge portion the recessed region lower in elevation than the central planar seating surface and causes the second cutting-edge portion to be formed with a radius, R, to aid in the evacuation of chips during a cutting operation, and wherein the first cutting-edge portion is used during a milling cutting operation and the second cutting-edge portion is used during a ramping cutting operation.

2. The double-sided, indexable cutting insert for a milling cutter of claim 1, wherein the first cutting-edge portion, the second cutting-edge portion and the third cutting-edge portion are substantially planar.

3. The double-sided, indexable cutting insert for a milling cutter of claim 2, wherein both the first cutting-edge portion and the second cutting-edge portion extend radially outward at an angle of between about 0.1 degrees to about 30 degrees with respect to the horizontal axis.

4. The double-sided, indexable cutting insert for a milling cutter of claim 1, wherein the first cutting-edge portion, the second cutting-edge portion and the third cutting-edge portion are arcuate or curved.

5. The double-sided, indexable cutting insert for a milling cutter of claim 4, wherein the first cutting-edge portion is formed with a radius, R1, and wherein the second cutting-edge portion is formed with a radius, R2.

6. The double-sided, indexable cutting insert for a milling cutter of claim 1, further comprising a second side surface opposite the first side surface, a third side surface and a fourth side surface opposite the third side surface.

7. The double-sided, indexable cutting insert for a milling cutter of claim 6, further comprising a second cutting edge defined at an intersection between the first surface and the second side surface.

8. The double-sided, indexable cutting insert for a milling cutter of claim 7, wherein the second cutting edge is substantially V-shaped and includes a first cutting-edge portion extending radially outward with respect to a horizontal axis, a second cutting-edge portion extending radially outward with respect to the horizontal axis, and a third cutting-edge portion extending substantially parallel to the horizontal axis and between the first cutting-edge portion and the second cutting-edge portion.

9. The double-sided, indexable cutting insert for a milling cutter of claim 8, wherein the first cutting-edge portion, second cutting-edge portion and the third cutting-edge portion of the second cutting edge are substantially planar.

10. The double-sided, indexable cutting insert for a milling cutter of claim 9, wherein the first cutting-edge portion of the second cutting edge extends radially outward at an angle of between about 0.1 degrees to about 30 degrees with respect to the horizontal axis, and wherein the second cutting-edge portion of the second cutting edge extends radially outward at an angle of between about 0.1 degrees to about 30 degrees with respect to the horizontal axis.

11. The double-sided, indexable cutting insert for a milling cutter of claim 1, wherein the recessed region includes a chip breaker.

12. The double-sided, indexable cutting insert for a milling cutter of claim 1, further comprising a rake face adjacent the first cutting-edge portion.

13. The double-sided, indexable cutting insert for a milling cutter of claim 12, further comprising a chip breaker adjacent the rake face.

14. The double-sided, indexable cutting insert for a milling cutter of claim 1, wherein the first cutting-edge portion is higher in elevation than the central planar seating surface, and wherein the second cutting-edge portion is lower in elevation than the central planar seating surface.

15. A milling cutter, comprising:

a shank;

an upper portion having an insert pocket, the insert pocket including a bottom seating surface, an axial seating surface and a radial seating surface;

a cutting insert as recited in claim 1 mounted in the insert pocket.

16. The milling cutter of claim 15, wherein the cutting insert defines an angle, A, starting from a radial rake angle and passing through a center axis of the milling cutter in a range between about 0 degrees and about 90 degrees.

17. The milling cutter of claim 15, wherein a recessed region of the cutting insert defines a radius, R, in a range between about 0.5 mm to about 20 mm.

18. The milling cutter of claim 17, wherein the radius, R, defines a ramping angle, B, in a range between about 0 degrees and about 90 degrees.

* * * * *